United States Patent [19]

Akins

[11] Patent Number: 5,375,815
[45] Date of Patent: * Dec. 27, 1994

[54] FLEXIBLE FENCING SYSTEM

[76] Inventor: Edward A. Akins, Box 158, Winnipeg, Manitoba, Canada, R2H 3B4

[*] Notice: The portion of the term of this patent subsequent to Apr. 13, 2010 has been disclaimed.

[21] Appl. No.: 45,532

[22] Filed: Apr. 9, 1993

Related U.S. Application Data

[63] Continuation-in-part of Ser. No. 822,692, Jan. 21, 1992, Pat. No. 5,201,498.

[51] Int. Cl.⁵ .............................. E04H 17/18
[52] U.S. Cl. ............................ 256/26; 256/24
[58] Field of Search ............... 256/24, 25, 26, 27, 256/28, 29, 30, 62, 65, 71; 403/291

[56] References Cited

U.S. PATENT DOCUMENTS

| | | | |
|---|---|---|---|
| 60,357 | 12/1866 | Gerard | 256/25 |
| 4,208,037 | 6/1980 | Le Gal | 256/25 |
| 4,715,589 | 12/1987 | Woerndle | 403/291 |
| 4,844,424 | 7/1989 | Knudslien | 256/24 |
| 5,058,863 | 10/1991 | Maffet | 256/25 |
| 5,063,876 | 11/1991 | Harris | 256/25 |
| 5,201,498 | 4/1993 | Akins | 256/26 X |

Primary Examiner—Edward K. Look
Assistant Examiner—Michael S. Lee
Attorney, Agent, or Firm—Adrian D. Battison; Stanley G. Ade; Murray E. Thrift

[57] ABSTRACT

In a fencing system for animals the conventional rigid fence panels are interconnected by flexible members which allow the fence panel to move each relative to the next to accommodate impacts by a fractured animal. Different embodiments are shown including an elastic block between the posts, a flexible metal spring between the posts, a simple strap wrapped around the posts in a FIG. 8 arrangement and a modified elastic strap arrangement which includes two free ends engaged over a pin passing through an end post of the panel and an intermediate leg portion for engaging between the end post and the end post of a next adjacent panel.

23 Claims, 8 Drawing Sheets

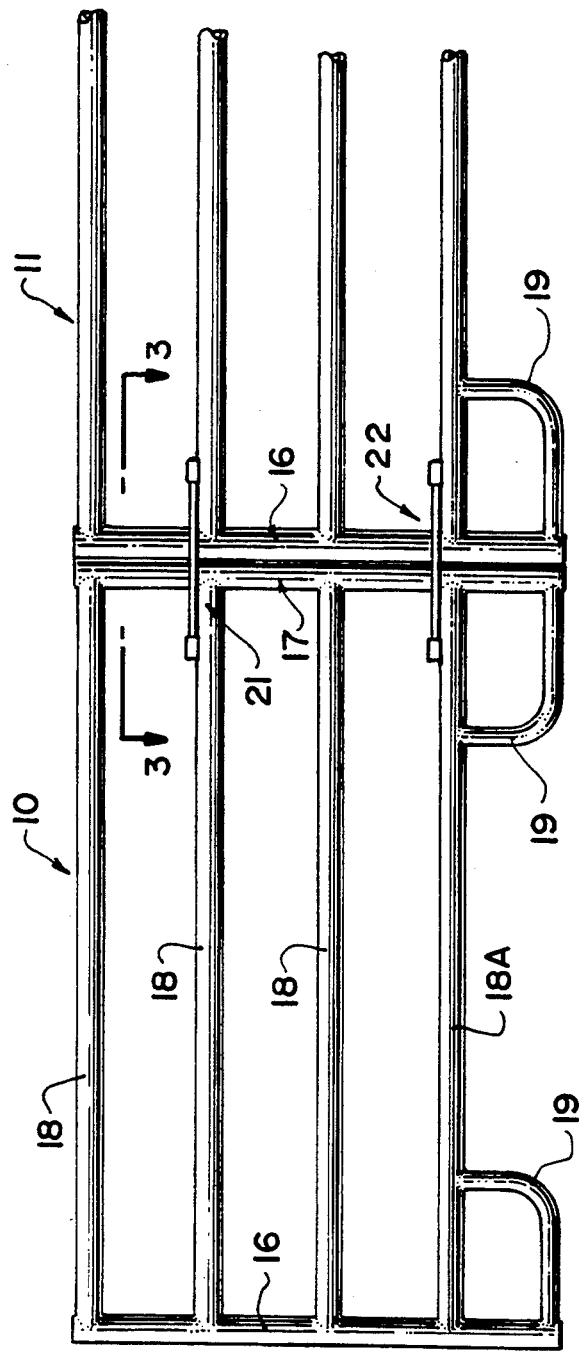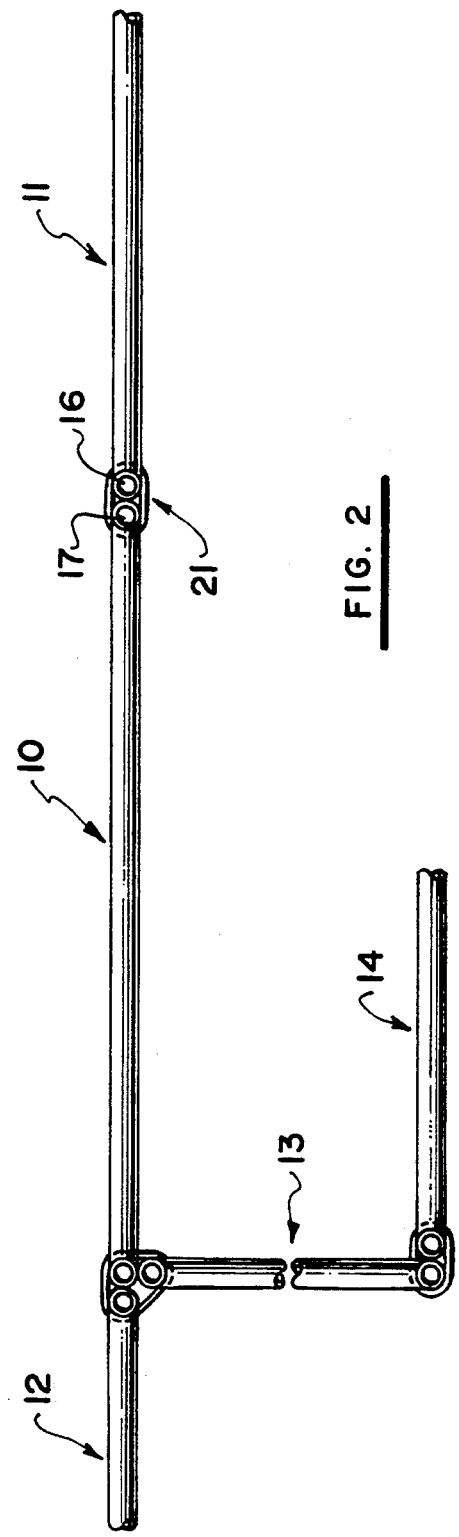

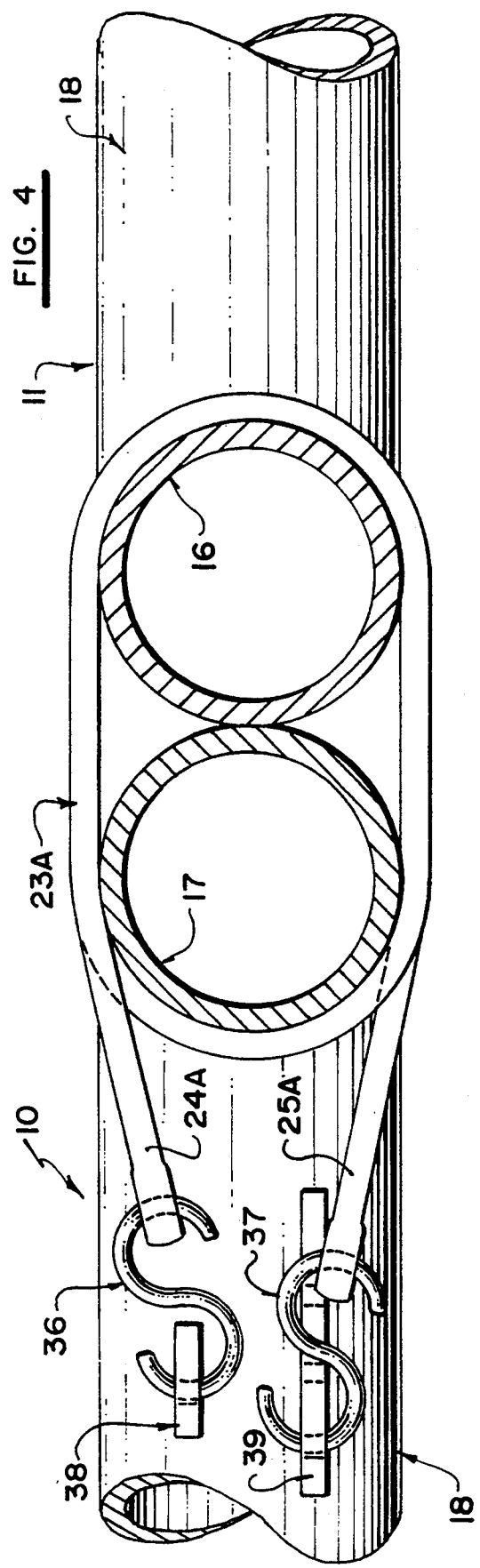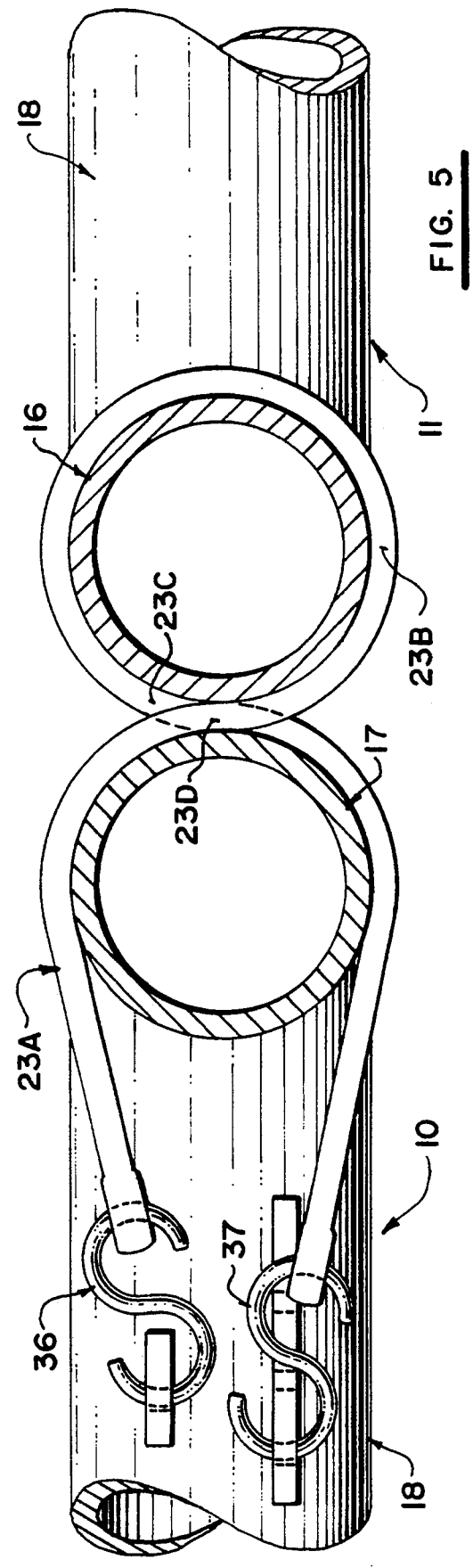

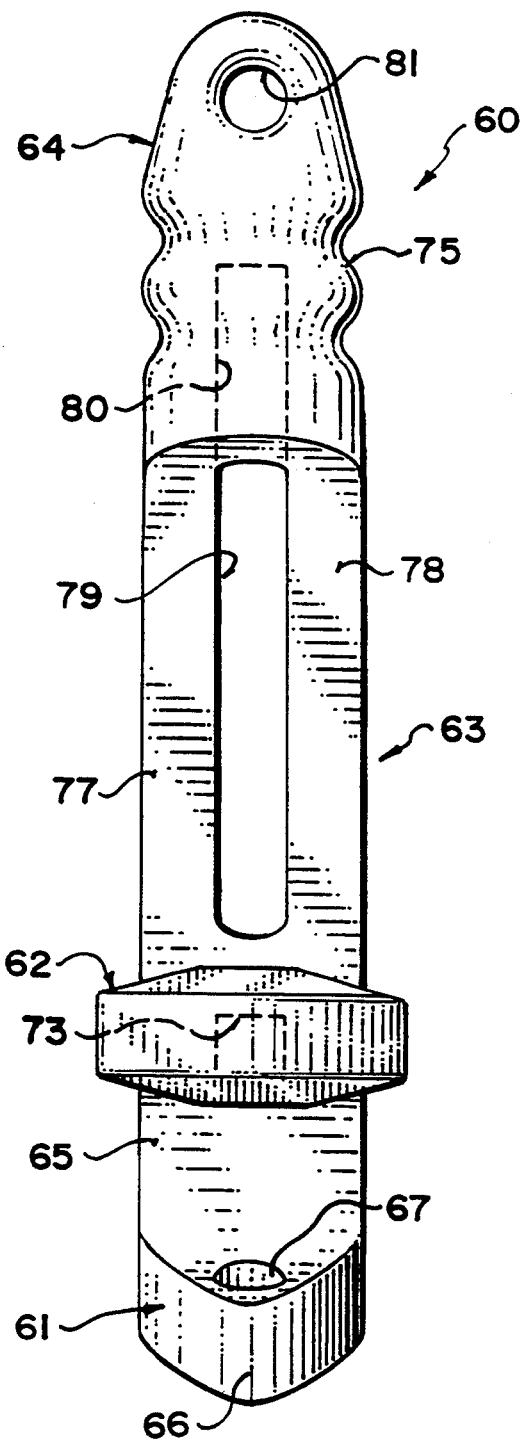
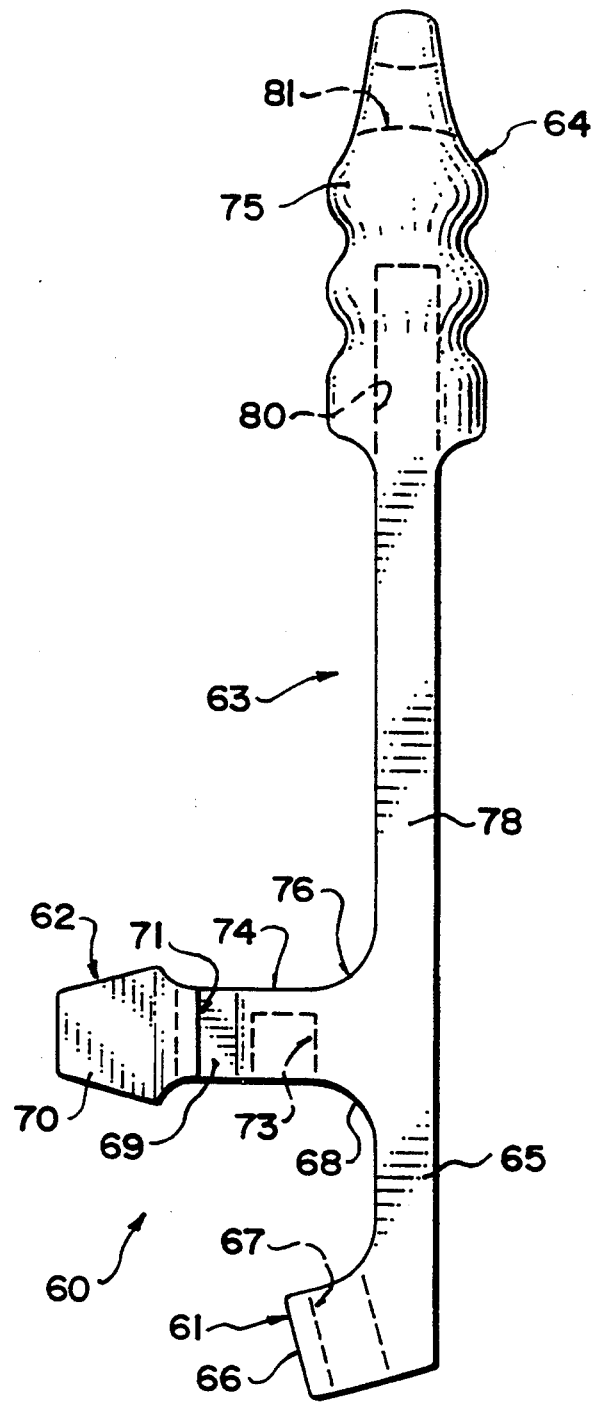
FIG. 9
FIG. 10

FLEXIBLE FENCING SYSTEM

This application is a continuation-in-part of application Ser. No. 822,692, filed Jan. 21, 1992 and now issued to U.S. Pat. No. 5,201,498 on Apr. 13, 1993.

This invention relates to a fencing system for confining animals.

BACKGROUND OF THE INVENTION

In the ranching of cattle, it is often desirable to set up temporary pens to confine the cattle. Generally these pens are formed from separate fence panels which are then connected together to form a pen structure. Each panel generally comprises a pair of spaced vertical end posts and a plurality of horizontal cross rails. Each of the posts carries a part of a connector element for connecting that end post to the end pest of a next adjacent panel. In many cases the connector comprises a vertical tubular portion which aligns with a corresponding tubular portion on the end post of the next adjacent panel for a simple rigid pin to be inserted through the aligned tubular portions to hold them in place against movement of one end post transversely relative to the next. In many cases one post has one such tubular element and the post of the next adjacent panel has two such tubular elements spaced apart to receive the first therebetween. The panel includes two such coupling elements one at the top and one at the bottom so that the posts are held parallel. The fence panels are then supported in vertical position by the cooperation with the next adjacent fence panel which is generally turned at fight angles. In some cases the fence panel is connected to only one adjacent panel. In other cases multiple connector arrangements are provided for connecting together the end posts of three panels arranged mutually at right angles. This allows a second pen to be formed adjacent the first pen with one of the panels acting as a dividing panel between the pens.

Generally the posts are formed from tubular metal either of square or circular cross section and a horizontal cross rails are formed from similar material either welded to the posts or in some cases formed by bending the post at the top comer to integrally form the horizontal top rail.

The penning thus formed is generally used for cattle which when kept on free range are often fractious and determined to escape from the confinement. An animal thus weighing between 600 and 2,000 pounds if alarmed or wishing to escape can cause a severe impact with the fence panel either deliberately or because of the state of alarm.

Fence panels of this general type are strong and resistant to damage. However the main cause for failure of such panels is due to damage resulting from impacts with the animal. The fence panel thus must be replaced many times more frequently than would be the case simply if the fence panel deteriorated due to corrosion or other minor damage.

SUMMARY OF THE INVENTION

It is one object of the present invention, therefore, to provide an improved fencing system which enables fence panels of the above general type to be used in a system which significantly reduces replacement of the panels due to damage caused by impact with the animals.

According to the invention there is provided a fencing system for confining an animal comprising a plurality of fencing panels, each panel comprising an integral substantially rectangular rigid structure including a bottom for resting on the ground, a top supported at height from the ground to confine the animal, a first end post and a second end post, and means for connecting a first end post of one panel to a second end post of a next adjacent panel, said connecting means including a first elastic spring at an upper portion of said first end post and a second elastic spring at a lower portion of said first end post, said elastic springs allowing flexible movement of said first end post relative to said second end post, each of said elastic springs comprising a flexible elastic band having a first free end attached to one of the fence panels, an intermediate portion wrapped around said end posts and a second free end attached to one of the fence panels.

According to a second aspect of the invention there is provided a fencing system for confining an animal including at least one fencing panel comprising an integral substantially rectangular rigid structure including a bottom for resting on the ground, a top supported at height from the ground to confine the animal, a first end post and a second end post, a substantially vertical elongate support member for holding said first end post vertical and a flexible elastic band, said elastic band being arranged for connecting said first end post to said support member, said flexible elastic band comprising a main band body having first free end attached to one of the fence panel and the support member, an intermediate portion wrapped around said first end post and the support member and a second free end attached to one of the fence panel and the support member and a leg portion projecting outwardly from the main band body at an angle thereto, the leg portion extending between the first end post and the support member.

According to a third aspect of the invention there is provided the fencing system wherein each of the upper and lower connecting means is arranged for engagement with an exposed portion of the end post of the adjacent panel free from said horizontal rails.

For the first time, therefore, the present applicant has provided a system in which the simple conventional fence panels formed by the well known technique of the welded posts and rails are modified by the use of an elastic coupling which enabled the coupling to flex when a panel is impacted by the animal thus reducing the stresses on the panel with a significantly reduced danger of damage to the panel. Of course this flexibility also can reduce the danger of injury to the animal.

Various techniques for providing the elastic coupling can be provided as described hereinafter.

Embodiments of the invention will now be described in conjunction with the accompanying drawings in which

BRIEF DESCRIPTION OF THE DRAWINGS

FIG. 1 is a front elevational view of a fencing system according to the present invention showing two panels connected together to form a temporary fence structure.

FIG. 2 is a top plan view of the fencing system of FIG. 1 showing a number of such panels connected together.

FIG. 4 is a similar cross sectional view of that of FIG. 3 showing a modified arrangement.

FIG. 5 is a cross sectional view similar to that of FIG. 3 showing a further modified arrangement.

FIG. 9 is a front elevational view of the elastic coupling band of FIG. 8.

FIG. 10 is a side elevational view of the band of FIG. 8.

DETAILED DESCRIPTION

Figure 3:
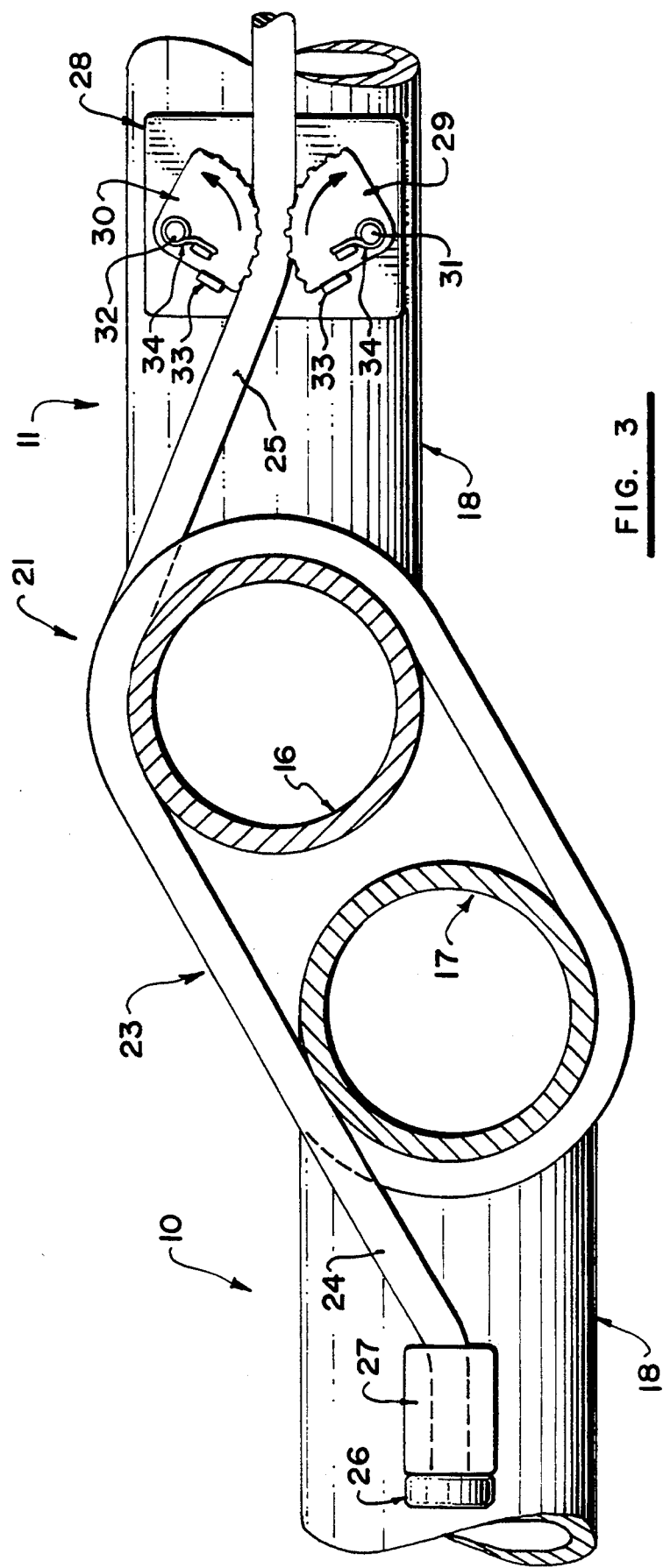
FIG. 3 is a cross sectional view along the lines 3—3 of FIG. 1.

The fencing system comprises a plurality of fence panels 10, 11, 12, 13 and 14. Each fence panel comprises a first vertical post 16 at one end and a second vertical post at a second end. Posts are connected by a plurality of horizontal parallel rails 18 so as to form a rigid welded rectangular structure. A lowermost one of the horizontal rails indicated at 18A is spaced from the ground so that the base of the posts 16 and 17 projects beyond the lowest rail 18A into contact with the ground to support of the panel standing upwardly from the ground. The height of the panel is sufficient such that with the post resting on the ground, the top rail is at a sufficient height to confine the animal concerned. At the bottom of the post 16 and 17 is provided a pair of bumpers 19 formed by a metal leg welded onto the base of the post and extending therefrom parallel to the bottom rail and then turned upwardly to engage the bottom rail and positioned part way along. This resists the tendency of a simple post to sink into soft ground.

The posts and rails and generally formed of the same tubular metal. In lightweight panels, this tubular metal can be one inch square tubing. In heavier duty panels, 1.5 inch or 2.0 inch circular tubing may be employed.

The fencing system as it is generally of a temporary nature intended for simple rapid erection and subsequent removal after the animals have been handled is formed without separate fixed posts so the support of the structure is obtained by locating fence panels at right angles so that each acts to provide a support to hold the next in the proper vertically upstanding position. Thus in FIG. 2, the panel 13 stands at fight angles to the panels 10 and 14 and must provide support to hold those panels in vertical position. The panel 12 is also supported of course by the panel 13 which stands at fight angles to the panel 12. The panels 10 and 11 lie in the same plane and hence the connection between the panel 10 and 11 provides no support. However it is intended (not shown) that the remote end of the panel 11 will be connected to a further panel at right angles thereto so that the panel 13 and the further panel provide sufficient support to hold the double span provided by the panel 10, 11 in the proper vertical orientation.

Thus each panel is connected to the next adjacent panel at the respective end post. Thus the end posts 17 of the panel 10 and 16 of the panel 11 are arranged in parallel abutting position and are connected by two separate connector elements schematically indicated in FIGS. 1 and 2 at 21 and 22 respectively. These connecting elements are positioned toward the top and toward the bottom of the panels so as to maintain the posts in the parallel vertical abutting or closely adjacent position.

In the conventional arrangement, the connecting elements are defined by rigid couplings often of the type including a rigid pin connecting together two sleeves each attached to a respective one of the posts. This provides a rigid connection between the panels so that the whole fence structure becomes rigid apart from the possibility for pivotal movement about a vertical axis defined by the pins. A modified construction of connection is shown in FIGS. 3, 4, 5, and 6 and will be described specifically hereinafter.

Turning therefore firstly to FIG. 3, the posts are indicated at 17 and 16 and in FIG. 3 these are shown in a position in which the post 16 has been moved by an impact force applied to the panel 11. This allows the top part of the post 16 to move away rearwardly from the post 17 while the base of the post 16 remains aligned with the post 17 in view of the connection 22 and in view of the engagement of both of the posts with the ground.

The connecting element 21 comprises an elastic band 23 which has a first end 24 connected to the panel 10 and a second end 25 connected to the panel 11. The end 24 includes a molded end cap 26 which is of increased diameter relative to the generally cylindrical body of the band 24. The cylindrical body of the band 23 is of constant cross section and is attached to a rail 18 of the panel 10 by insertion of the body through a sleeve 27 welded on the upper side of the rail 18. The band 23 is thus threaded through the sleeve until the end cap 26 engages an end face of the sleeve thus holding the band in place.

The band is wrapped around the abutting posts 16 and 17 through 360" following which the outer end 25 is attached to a rail 18 of the panel 11. The attachment i-mechanism for the end 25 comprises a plate 28 welded on the upper face of the rail 18 with the plate carrying a pair of pivotal quadrants 29 and 30. Each of the quadrants is mounted on a respective pin 31, 32 for pivotal movement about a vertical axis. The quadrants are moveable from a pinched or latched position as shown to a release position. In the latch position shown, the quadrants engage against stop members 33 which hold the quadrants against movement further toward the post 16. An outer face of the quadrant is knurled to engage the elastic band. The quadrants are spring biased by a spring 34 into the pinched or latched position. This quadrant arrangement thus allows the end 25 of the band to be inserted into the space between the two quadrants and then can be pulled away from the post 16 to slide through the quadrants causing them to move in the direction of the arrows to release the band to move in the direction to tension the band. When released, however, the band pulls the quadrants back into the latched position and cannot thus move further towards the untensioning direction.

In operation, therefore, the band is carried normally upon the post 10 and simply suspends from the rail 18. When it is required to connect the panel 10 to the next adjacent panel, the band is grasped, the posts are positioned in the required abutting position, the band is wrapped around the abutting posts and inserted into the latch and tensioned.

The wrapping can be applied through 360" or through a greater angle so as to provide a double or more wrap around the post.

Normally the posts are held in the aligned position shown in FIGS. 2 and 4. However in the event of an impact by an animal on the panel, the panel can move as shown in FIG. 3 by a stretching of the elastic band. The amount of stretch is sufficient to prevent damage to the panel by the impact. The action of the band is to return the panel to its initial position due to the elastic stretch in the band. The panels are thus maintained substantially vertical by the elastic coupling but the elastic coupling allows sufficient flexibility to prevent the panels from being damaged by the sudden forces generated by an impact with a fractious animal.

An alternative arrangement is shown in FIG. 4 in which the band 23A is again wrapped around the posts 16 and 17. In this case, however, the band is wrapped sufficiently around the posts such that the ends 24A and 25A are both connected to the panel 10. In this case the ends include simple S hooks 36 and 37 which connect to upstanding lugs 38 and 39 on the rail 18. The lug 39 includes a plurality of openings defining a plurality of positions for the S hook 37 to increase or decrease the tension in the band.

In FIG. 5 is shown a modified arrangement for attachment of the end posts 17 and 16 of the panel 10 and 11 respectively. In this arrangement the structure is substantially identical to that shown in FIG. 4 including the elastic band or strap 23A and the S-hooks 36 and 37. In this embodiment, however, the elastic band 23A is wrapped around the end posts 16 and 17 substantially in a figure of eight configuration to form a loop 23B wrapped around the post 16 and two portions 23C and 23D passing between the posts 16 and 17 and thus holding the posts 16 and 17 elastically apart. It will be noted that the loop of the band does not pass wholly around the post 17 but instead extends to the Shook which are connected to the rail 18.

This construction has the advantage that the posts 16 and 17 are held slightly apart by the portions 23C and 23D of the two separate bands, only one of which is shown in FIG. 5. Thus the posts are not abutting or rubbing against one another and the elastomeric material of the bands acts as a bearing surface to allow slight movement of one post relative to the next. In addition the loop configuration of the band acts to better locate the posts in an aligned position so they are less likely to twist from the proper common vertical plane and they are more likely to return to the common vertical plane after impact with the animal. However the band is sufficiently elastic in the relatively short portion between the posts to allow the necessary movement and the bands are sufficiently slippery to allow movement of the bands relative to the post to provide additional stretch where necessary.

The strap can be formed from any suitable elastic material which has sufficient strength and elasticity to provide the function set forth above. One example of a strap which would be suitable is that manufactured by UniRoyal Chemical and sold under the trademark "Vibrathane". The strap or band is indicated as being of cylindrical cross section but other cross sections may be used.

The arrangement described above provides the advantages as follows:

1. It reduces damage to the panel due to the sudden forces generated by an impact with the animal which can break welds and cause bending of the rails and posts. The flexibility of the strap is just sufficient to enable the flexing or stretching of the strap to take up the impact forces to reduce the possibility of damage to the panel itself.

2. The elastic band enables a simple and rapid hook up of one panel to the next panel since this can be done readily by simply wrapping each of the two straps individually around the posts and latching the strap in place. The simple strap connection can be used either with two posts, three posts or even more posts simply by providing a strap which is sufficient in length to accommodate the maximum number of posts and then by tensioning the strap down to the required length if a smaller number of posts is involved.

3. In the arrangements shown in FIG. 4 and 5, the posts do not need to be connected at the same height since the post 16 of the panel 11 can be arranged at different heights relative to the post 17. This arrangement can accommodate uneven ground or stepped ground where it is required to step the fence panels upwardly or downwardly in a particular direction.

For the first time, therefore, the present invention is provided a system which enables the fencing to be sufficiently flexible to accommodate damaging impact while maintaining the panel substantially in conventional form and thus manufactured in the conventionally cheap manner of the simply welded rails and posts.

Figure 6:
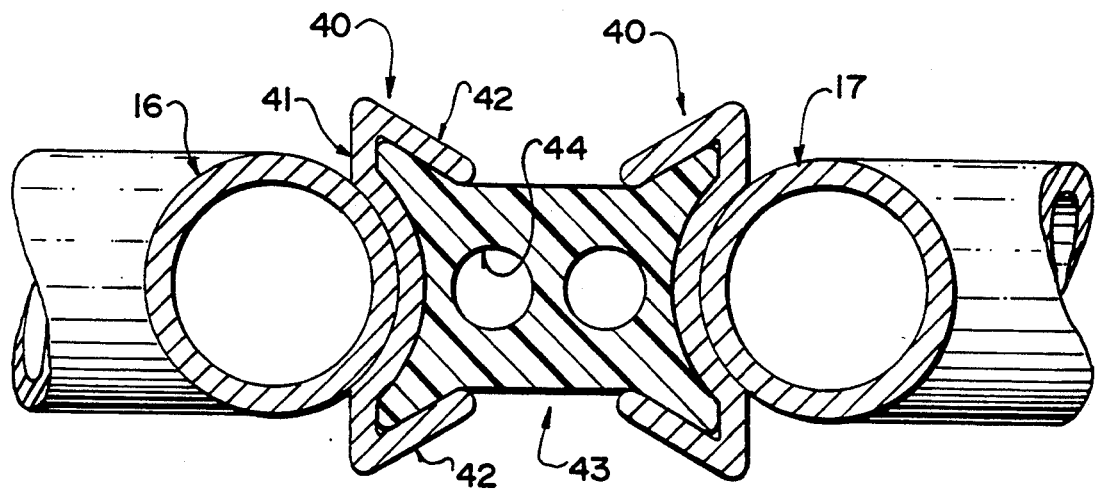
FIG. 6 is a cross sectional view similar to that of FIG. 3 showing a still further modified arrangement.
Figure 7:
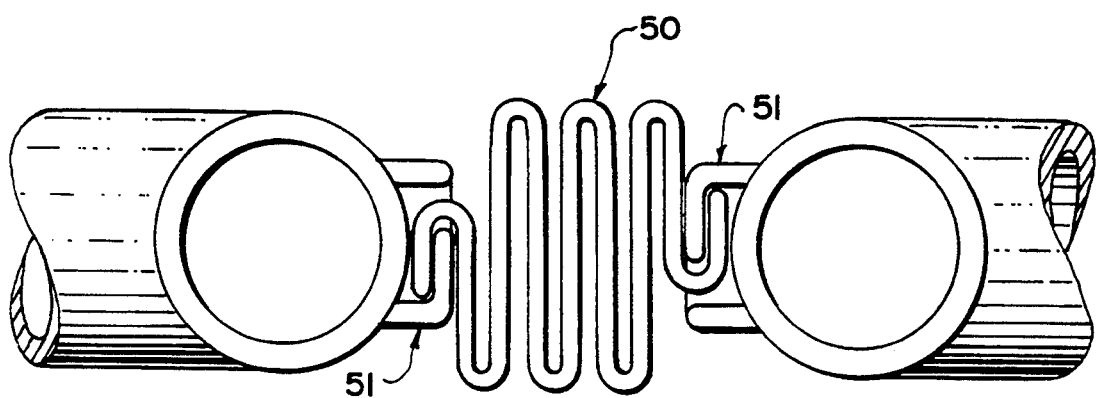
FIG. 7 is cross sectional view similar to that of FIG. 3 showing a yet further modified arrangement.

Turning now to FIGS. 6 and 7, alternative arrangements are shown for coupling between the posts 16 and 17. In the arrangement shown in FIG. 6, each post has a channel section 40 welded thereto on a face extending towards the opposed post. Each channel section includes a base plate 41 attached to the post and inwardly converging flanges 42 extending outwardly from the base plate 41. This forms a key way slot for receiving a flexible coupling block 43 formed of rubber or other suitable elastic material. The length of the channels 40 is sufficient to provide a coupling at the top and bottom of the panels respectively and the block is generally of similar shape and length to the channels. The posts can be connected simply by sliding longitudinally with the block being attached for example by adhesive to one of the channels and allowed to slide vertically downwardly into the other of the channels. The centre of the block includes holes 44 which allow flexing of the block in a shear direction to allow one of the posts to move in a direction generally at a right angles to a plane joining the post.

In FIG. 7 is shown a similar arrangement in which metal spring 50 is attached to flanges 51 on the post. The metal spring again is resilient and is convoluted form to allow movement of one post relative to the other post.

A further embodiment is shown in FIGS. 9 through 13 which involves the modification of otherwise conventional fence panels to include a support pin for each of the elastic coupling bands and a specially designed elastic coupling band engagable over the pin and wrapped around two end posts of adjacent panels to hold the end posts in aligned position while allowing some flexibility in the coupling to accommodate impact by the animals as previously described.

Figure 13:
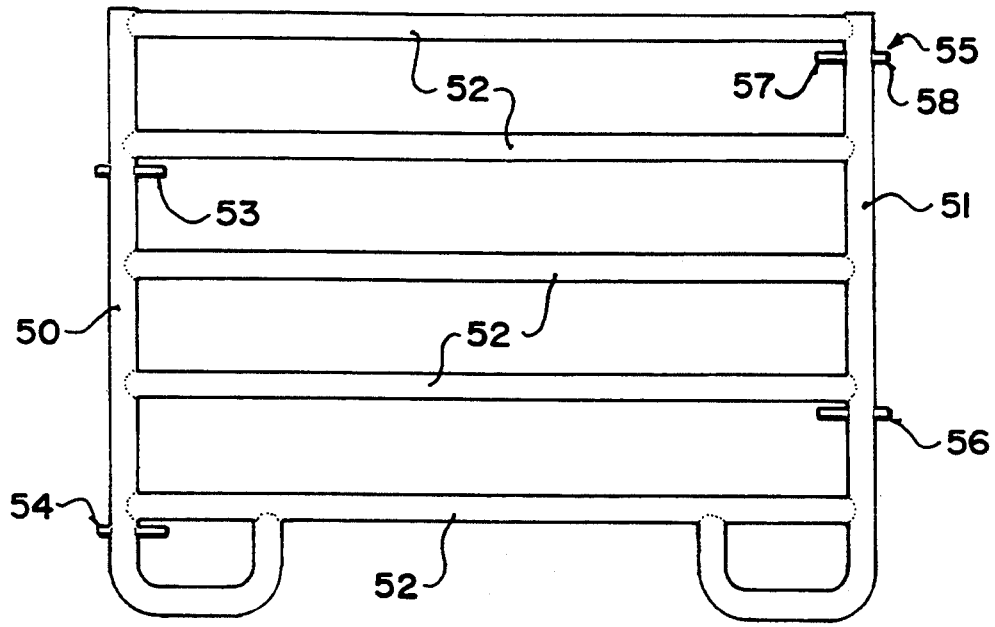
FIG. 13 is a side elevational view of one fence panel.

As shown in FIG. 13, each fence panel includes end upright posts 50 and 51 together with a plurality of horizontal rails 52. Through each of the posts 50 and 51 is mounted a pair of pins 53, 54, 55 and 56. Each pin lies in the plane of the fence panel and extends through the post at right angles thereto so as to have a first portion 57 projecting on the inside of the fence post and a second portion 58 extending outwardly beyond the fence post toward the next adjacent end post. At the end post 51, the pins are arranged just under the first and fourth horizontal rails. At the end post 50 the pins are arranged just under the second and fifth horizontal rails. In this way the pins are vertically offset when the end post 50 is brought to a position adjacent to an end post 51A of a next adjacent fence panel.

The construction of the elastic band is shown in FIGS. 8 through 12. The elastic band is generally indicated at 60 and is formed from a suitable rubber or similar compound which allows it to stretch and to maintain that stretch over a number of years without deterioration due to climatic conditions for engagement with animal materials.

The elastic band 60 has a first free end 61 for engagement over the pin 55, an intermediate leg portion 62 which is also engagable over the pin, a loose strap portion 63 extending from the leg portion 62 and a second free end 64 also engagable over the pin.

Figure 8:
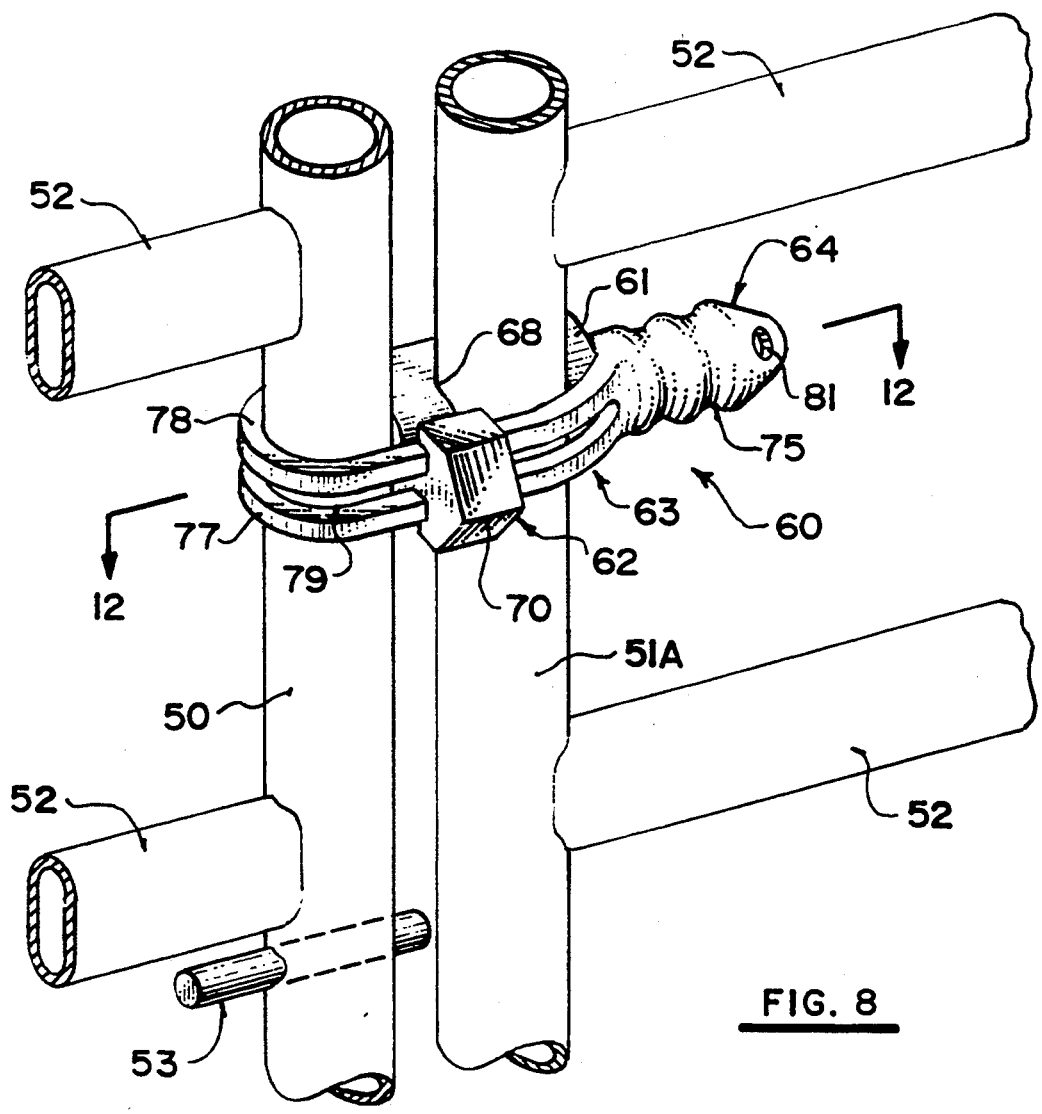
FIG. 8 is an isometric view of portions of two fence panels showing one of the elastic couplings connecting together the end posts of the adjacent panels.
Figure 12:
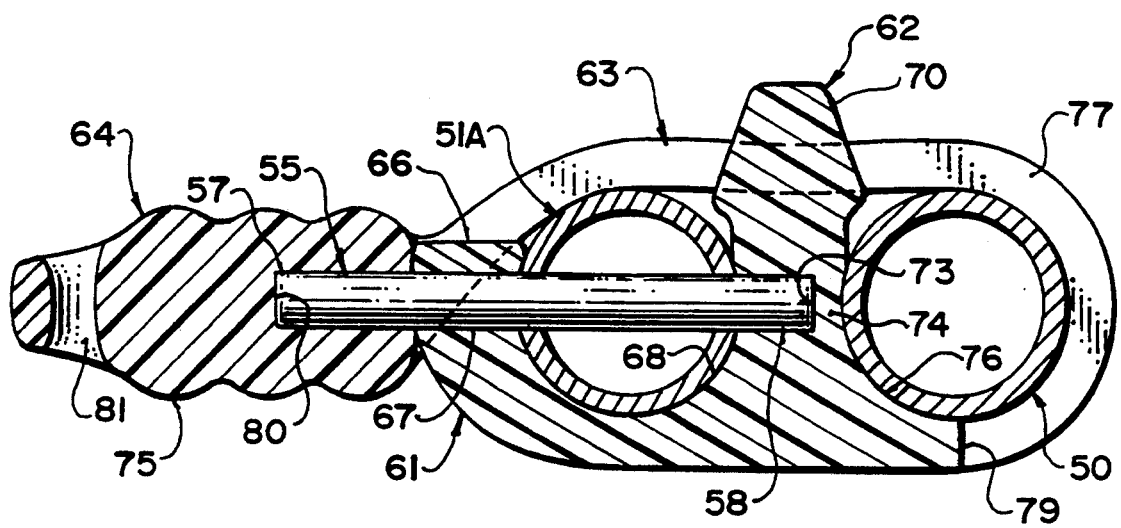
FIG. 12 is a cross-sectional view along lines 12—12 of FIG. 8.

The initial relaxed state of the elastic band is shown in FIG. 10 and the wrapped condition of the band is shown in FIGS. 8 and 12. Referring firstly to FIG. 10, the free end 61 extends from a fiat strap portion 65 adjacent one side of the leg 62 to a raised arch portion 66 with a hole 67 extending through the raised arch portion at an angle to the flat strap portion 65.

As shown in FIG. 12, the raised arch portion 66 is engaged so that the hole 67 passes along the portion 57 of the pin with the length of the arch portion substantially less than the length of the pin portion 57 so the free end of the pin portion projects outwardly beyond the free end of the elastic band when the elastic band comes into contact with the adjacent face of the end post 51A.

Figure 11:
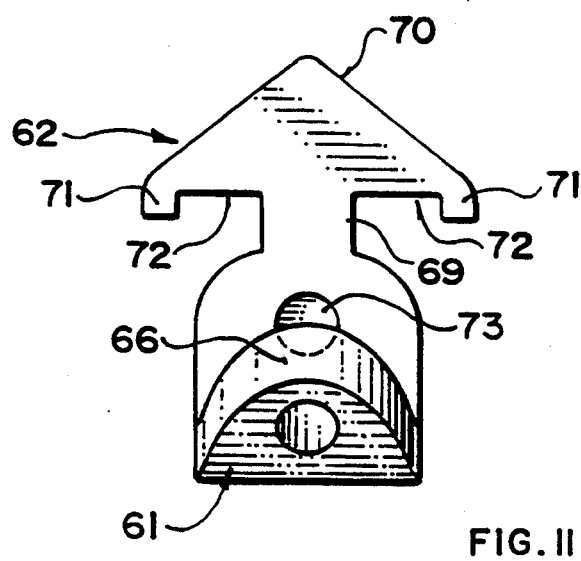
FIG. 11 is an end elevational view of the band of FIG. 8.

The flat strap portion 65 smoothly curves at 68 into the base of the leg portion 62 so this can engage around the end post 51A as best shown in FIG. 12. The leg portion 62 commences at a width equal to the strap portion 65 as best shown in FIG. 11 and then narrows to form a neck section 69 and a head portion 70 just beyond the neck section 69. As shown in FIG. 11 this forms an "arrow" shape with the head having a pair of lugs 71 at the outside edges thereof defining a channel area 72 along side the neck 69. In the wider portion of the leg is provided a second hole 73 which is a blind hole as shown in FIG. 10 and FIG. 12 extending from the side of the leg portion adjacent to the end post 51A to a position close to but spaced from the opposite side of the leg portion. This leaves a layer of the rubber material 74 just beyond the end of the hole for engagement with the end of the pin 55.

As shown in FIG. 12, the leg portion can be stretched around the end post 51A from the free end 61 until the end portion of the pin engages into the blind hole 73 thus latching the leg portion onto the end post 51A. In this position the head 70 projects beyond a tangent to the post 51A parallel to the pin 55.

With the leg portion and the free end attached to the post, this leaves the strap portion 63 and the second free end loose and free to extend from the post 51A. Engagement of the portions on the pin however maintain the strap in connection with the pin so that there is little or no danger of the strap being released from the pin inadvertently.

The free end 64 includes a handle 75 with a plurality of transverse ribs to allow the handle to be grasped and the strap pulled. The strap portion 63 extending from the leg portion 62 includes a similar curved section 76 symmetrical with the curved section 68. The strap portion 63 includes a pair of parallel straps 77 and 78 defining a slot 79 therebetween. The slot extends to a position closely adjacent the leg to the handle 75 and then continues as a blind hole 80 within the handle extending longitudinally of the handle. At the end of the handle is provided a transverse hole 81. As shown in FIG. 12, when the second end post 50 is brought up to the end post 51A to a position in engagement with the side of the leg portion remote from the post 51A, the post 50 is engaged into the curved area 76 along side the leg portion and from that area the elastic strap portion 63 can be wrapped around the second post 50. As best shown in FIG. 8, the head 70 can be pushed through the slot to receive each of the side straps 77 and 78 within the channels 72 to hold the strap portion engaged with and locked against the leg portion after wrapping around the post 50. From that position the handle 75 can be pulled to stretch the strap portion 63 to a position where the blind hole 80 can be engaged over the free exposed portion 57 of the pin to take up the position shown in FIG. 12 in which the second free end is also engaged onto the pin.

As the pin is welded into position within the end post, the pin thus acts to lock both ends of the strap onto the end post 51A while the second exposed portion 58 of the pin act to locate and hold the second post 50 at the required spaced position in engagement with the side of the leg portion.

The fence panel is unique in respect of the additional pins which are provided at the positions shown in FIG. 13 to act to receive the elastic straps. The shape of the elastic strap is unique in that it has the two free ends for engagement over the pin and the intermediate leg portion at fight angles of the two free ends for engagement between the two posts and for engagement with the free strap portion of the band.

Normally the end posts 50 and 51A will be interconnected only by two of the elastic bands arranged on the pins are one of the end posts. In a situation where increased forces of connection are required, additional elastic straps can be attached onto the pins of the other of the posts so as to provide four elastic connections between each post and the next. Alternatively, a third post can be connected to one of the two posts of the connection of FIG. 8 by bringing the third post into position adjacent one of the first posts and using the pins on that third post which are vertically spaced from the pins used to couple the first two posts. It will be appreciated in this way that a connection between up to four of the posts can be arranged provided the panels are arranged in the correct orientation to engage the pins at the vertically spaced location on the abutting posts.

Figure 14:
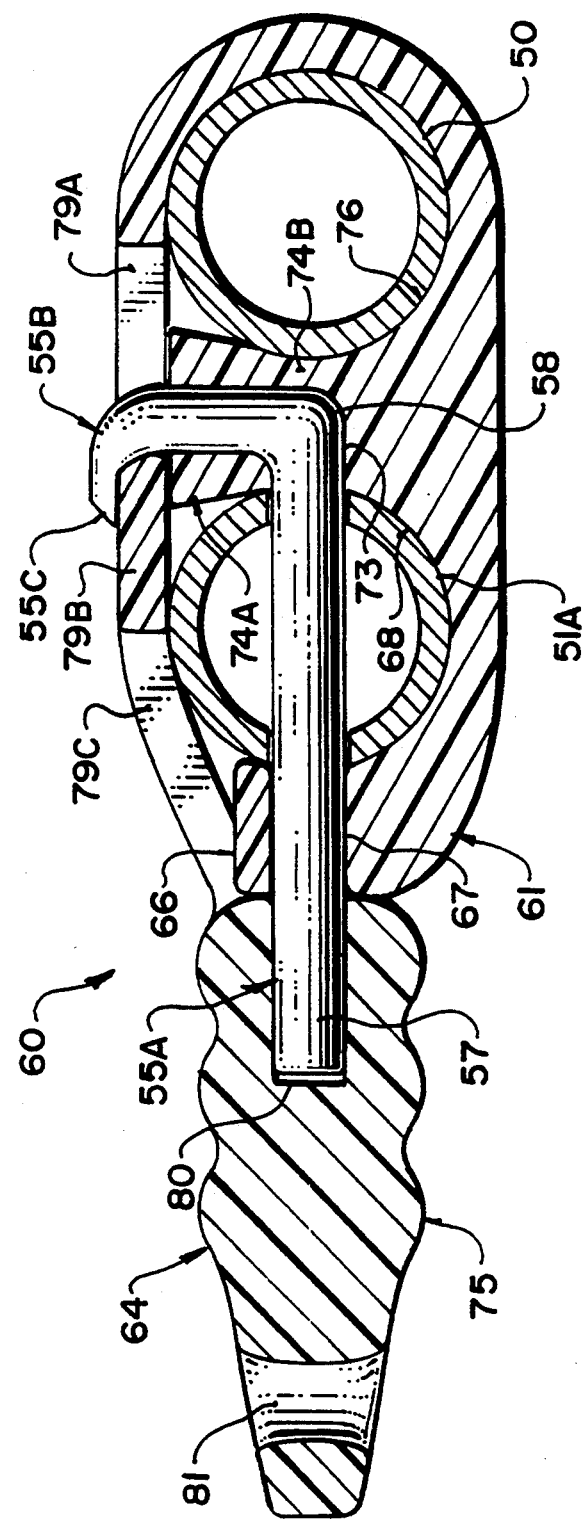
FIG. 14 is a cross sectional view similar to that of FIG. 12 showing a modified arrangement.

FIG. 14 shows a modified arrangement similar to that of FIG. 12 and operating in effectively the same manner. In this embodiment, however, the pin 55A is modified by the addition of a hook portion 55B which is bent initially at fight angles and then is curved so as to define an end hook 55C which projects back generally parallel to the main body of the pin 55A. The hook 55C projects outwardly beyond an end 74A of the intermediate portion 74B between the posts 50 and 51A. The hook 55C projects through a first slot 79A in the strap portion 60 and engages an outside surface of a transverse bar 79B of the strap portion. The transverse bar is defined between the slot portion 79A and a second slot portion 79C which extends up to the handle 64 and the end of the pin 55A. This arrangement has the advantage that the pin is locked in place through the post 51A by the angle section 55B and thus cannot simply fall out. This therefore avoids the necessity for welding the pin into the post. The second advantage is that the grasping of the band 60 at the transverse bar 79B provides an initial longitudinal force on the band holding the band against returning toward the fight as shown. The band is thus stretched in two actions, the first to be necessary to engage the bar 79B under the hook 55C and the second stretching action engaging the handle 64 over the end of the pin 55A.8

Since various modifications can be made in my invention as hereinabove described, and in any apparently widely different embodiments of same made within the spirit and scope of the claims without departing from such spirit and scope, it is intended that all matter contained in the accompanying specification shall be interpreted as illustrative only and not in a limiting sense.

I claim:

1. A fencing system for confining an animal comprising a plurality of fencing panels, each panel comprising an integral substantially rectangular rigid structure including a bottom for resting on the ground, a top supported at height from the ground to confine the animal, a first end post and a second end post, and means for connecting a first end post of one panel to a second end post of a next adjacent panel, said connecting means including a first elastic spring at an upper portion of said first end post and a second elastic spring at a lower portion of said first end post, said elastic springs allowing flexible movement of said first end post relative to said second end post, each of said elastic springs comprising a flexible elastic band having a first free end attached to one of the fence panels, an intermediate portion wrapped around said end posts and a second free end attached to one of the fence panels.

2. The fencing system according to claim 1 wherein both the first and second free ends of the elastic band are attached to the same fence panel.

3. The fencing system according to claim 1 wherein the elastic band includes a portion thereof extending between said first end post and said second end post.

4. The fencing system according to claim 3 wherein the elastic band includes a leg portion thereof projecting outwardly from a main band body at an angle thereto, the leg portion extending between said end posts.

5. The fencing system according to claim 4 wherein the leg portion includes means an end thereof for engagement with a portion of the band crossing between the end posts so as to lock together the leg portion and the portion of the band.

6. The fencing system according to claim 1 wherein the second free end of the elastic band has a handle thereon for manual grasping.

7. The fencing system according to claim 1 wherein the elastic band includes engagement means thereon for attaching the elastic band to said first end post leaving a strap portion of the elastic band projecting outwardly from the first end post for wrapping around the second end post.

8. The fencing system according to claim 7 wherein the first end post includes a transverse pin extending therethrough at right angles and having a first pin portion projecting outwardly from one side of the first end post, the elastic band having a first hole at the first free end thereof engagable over the pin so as to slide down the first pin portion into engagement with the first end post leaving a portion of the first pin portion exposed, and a second hole at the second tree end of the band engagable over the exposed portion of the first pin portion.

9. The fencing system according to claim 8 wherein the band includes a leg portion at an intermediate position along the length thereof, the leg portion projecting outwardly therefrom at an angle thereto so as to engage around the first end post, the leg portion having a hole therein receiving a second pin portion of the pin projecting through the post to a position opposite said first pin portion such that said one free end and said leg portion are engaged onto the pin with the leg portion projecting between the first end post and the second end post, the strap portion of the elastic band between the leg portion and the second free end being free to be wrapped around said second end post.

10. The fencing system according to claim 9 wherein the strap portion includes an elongate slot between two parallel straps and wherein there is provided at an end of the leg portion a head member engageable between the straps to hold the straps in engagement with the leg portion.

11. The fencing system according to claim 9 wherein the second portion of the pin includes a hook member extending through the leg portion and projecting outwardly therefrom for hooked engagement with the strap portion.

12. The fencing system according to claim 1 wherein each fence panel includes at each end post thereof a pair of horizontal pins at vertically spaced positions on the end post, each pin extending through the end post in a direction lying in a longitudinal vertical plane of the panel, the pins at one end post of the panel being vertically offset from the pins at the other end post of the panel.

13. A fencing system for confining an animal including at least one fencing panel comprising an integral substantially rectangular rigid structure including a bottom for resting on the ground, a top supported at height from the ground to confine the animal, a first end post and a second end post, a substantially vertical elongate support member for holding said first end post vertical and a flexible elastic band, said elastic band being arranged for connecting said first end post to said support member, said flexible elastic band comprising a main band body having first free end attached to one of the fence panel and the support member, an intermediate portion wrapped around said first end post and the support member and a second free end attached to one of the fence panel and the support member and a leg portion projecting outwardly from the main band body at an angle thereto, the leg portion extending between the first end post and the support member.

14. The fencing system according to claim 13 wherein the leg portion includes means at an end thereof for engagement with a portion of the main band body crossing between the first end post and the support member so as to lock together the leg and the portion of the main band body.

15. The fencing system according to claim 13 wherein the second free end of the elastic band has a handle thereon for manual grasping.

16. The fencing system according to claim 13 including engagement means for attaching the elastic band to said first end post leaving a loose strap portion of the elastic band projecting outwardly from the first end post for wrapping around the support member.

17. The fencing system according to claim 16 including a transverse pin extending through said first end post at right angles and projecting outwardly from opposed sides of the first end post, said elastic band comprising a first hole at the first free end thereof engageable over the pin so as to slide down the pin into engagement with the first end post leaving a portion of the pin exposed and a second hole at the second free end of the band engageable over the exposed portion of the pin.

18. The fencing system according to claim 17 wherein the leg portion includes a hole therein for receiving a second portion of the pin projecting through the first end post from said one free end such that said one free end and said leg portion are engaged onto the pin.

19. The fencing system according to claim 19 wherein the strap portion includes an elongate slot between two parallel straps and wherein there is provided at an end of the leg portion a head member engageable between the straps to hold the straps in engagement with the leg portion.

20. The fencing system according to claim 18 wherein the second portion of the pin includes a hook member extending through the leg portion and projecting outwardly therefrom for hooked engagement with the strap portion.

21. A fencing system comprising a plurality of fence panels each comprising an integral substantially rectangular rigid structure including a bottom for resting on the ground, a top supported at height from the ground to confine the animal, a first end post, a second end post, a plurality of horizontal rails interconnecting the end posts, and means for use in connecting the first end post of one panel to an end post of a next adjacent panel, said means comprising for each panel at each of the first and second end posts thereof, a pair of horizontal pins at vertically spaced positions on the respective end post, each pin extending through the respective end post in a direction lying in a longitudinal vertical plane of the panel, the pins at the first end post of the panel being vertically offset from the pins at the second end post of the panel.

22. A fencing system for confining an animal comprising a plurality of fencing panels, each panel comprising an integral substantially rectangular rigid structure including a bottom for resting on the ground, a top supported at a height from the ground to confine the animal, a first end post and a second end post and a plurality of horizontal rails, each of said first end post and said second end post of each of said panels including upper and lower connecting means for connecting between the respective end post and the end post of an adjacent panel, the upper and lower connecting means at the first end post being vertically offset from the connecting means at the second end post for cooperating with the end post of the adjacent panel at a different height thereon each said connecting means comprising a hole extending through the post in a direction lying in a longitudinal vertical plane of the panel, each hole being arranged to receive a pin therethrough.

23. The fencing system according to claim 22 wherein each of the upper and lower connecting means is arranged for engagement with an exposed portion of the end post of the adjacent panel free from said horizontal rails.

* * * * *